United States Patent
Yang

(10) Patent No.: US 7,570,038 B2
(45) Date of Patent: *Aug. 4, 2009

(54) CONTROL CIRCUIT TO REDUCE REVERSE CURRENT OF SYNCHRONOUS RECTIFIER

(75) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/451,454

(22) Filed: Jun. 13, 2006

(65) Prior Publication Data

US 2007/0285070 A1    Dec. 13, 2007

(51) Int. Cl.
*G05F 1/618* (2006.01)
*G05F 1/46* (2006.01)

(52) U.S. Cl. .................. 323/284; 323/285

(58) Field of Classification Search ............. 323/222, 323/224, 282, 284, 285, 351, 288, 299, 315
See application file for complete search history.

(56) References Cited

U.S. PATENT DOCUMENTS 6,396,250 B1 *   5/2002   Bridge ............... 323/283
2007/0247128 A1 * 10/2007  Yang ................. 323/282

* cited by examiner

*Primary Examiner*—Gary L Laxton
(74) *Attorney, Agent, or Firm*—Rosenberg, Klein & Lee

(57) ABSTRACT

A control circuit for a power converter receives a switching signal that is applied to charge an inductor of the power converter. The control circuit includes a predication circuit that generates a timing signal in response to the switching signal. The timing signal is used to turn off a synchronous rectifier for preventing a reverse current during light load and no load conditions.

12 Claims, 7 Drawing Sheets

CONTROL CIRCUIT TO REDUCE REVERSE CURRENT OF SYNCHRONOUS RECTIFIER

FIELD OF INVENTION

The present invention relates in general to power converter, and more particularly, to the control circuit of power converter.

BACKGROUND OF THE INVENTION

Power converters are used to convert an unregulated power source to a regulated voltage and/or current source. FIG. 1 shows a traditional power converter with synchronous rectification. A switching signal $S_1$ is utilized to control the duty cycle of a switch 10 for the regulation of the output voltage $V_O$. The output voltage $V_O$ is provided to a load 50. A charge current will charge an output capacitor 40 during the on time of the switch 10. FIG. 2 shows a switching signal $S_2$ to enable a switch 20 in response to the off-state of the switch 10 to provide a low impedance current path for a discharge current $I_F$ of the inductor 30. A switching signal $V_W$ is applied to charge the inductor 30 once the switch 10 is turned on.

In continuous current mode (CCM) operation, the switch 10 is turned on before the energy of the inductor 30 is completely discharged. For the discontinuous current mode (DCM), the energy in the inductor 30 is fully discharged before the start of the next switching cycle. FIG. 3 shows a reverse current $I_R$ discharge the output capacitor 40 through the switch 20 during the DCM operation. The reverse current $I_R$ will cause the power loss and lower the efficiency of the power converter at light load and no load conditions. FIGS. 4A and 4B show CCM and DCM waveforms respectively, wherein the $I_{IN}$ is the charge current.

FIG. 5 shows a traditional forward power converter including synchronous rectifier, in which to provide the output voltage $V_O$ to a load 55. A secondary winding of a transformer 60 generates a switching voltage to turn on a rectifier 16 and charge an inductor 35. A capacitor 45 is coupled to the inductor 35. During the off period, the switching voltage is reversed, the rectifier 16 is turned off and a rectifier 26 is switched on to discharge the energy of the inductor 35. Switches 15 and 25 serve as synchronous rectifiers used to reduce the power loss of the rectifiers 16 and 26. Switching signals $S_3$ and $S_4$ are synchronized with the switching voltage for switching the switches 15 and 25 respectively. A switching signal $V_W$ is applied to charge the inductor 35 once the rectifier 16 is turned on. The charge current of the inductor 35 is proportional to the voltage and the pulse width of the switching signal $V_W$. According to the voltage and the pulse width of the switching signal $V_W$ and the output voltage $V_O$, the discharge time of the inductor 35 can be predicted to avoid the reverse current for synchronous rectification.

Prior art methods of limiting the reverse current in a synchronous rectifier includes the use of a current sensing circuit to turn off the synchronous rectifier once the reverse current is detected. The current sensing circuit involves using the turn-on resistor ($R_{DS}$-ON) of the transistor (synchronous rectifier) or a series resistor to detect the reverse current. However, these current sensing circuit cause power loss and add complexity to the system. Moreover, the synchronous rectifier can only be turned off after the reverse current is generated and detected. Accordingly, a control circuit that eliminates the effects of reverse current without the current sensing circuit would be advantageous.

SUMMARY OF THE INVENTION

The present invention provides a control circuit to reduce a reverse current of a synchronous rectifier. A predication circuit is utilized to generate a timing signal in accordance with a control signal and a switching signal. The on time of the switching signal represents the charge time of an inductor of a power converter. The timing signal is applied to turn off the synchronous rectifier of the power converter for preventing the reverse current of the synchronous rectifier in light load and no load conditions. An on time of the timing signal is increased in response to an increase of a voltage of the switching signal. The control signal is set related to the output voltage of the power converter. Furthermore, the on time of the timing signal is decreased in response to a decrease of the on time of the switching signal.

The predication circuit comprises an input circuit and a timer circuit. The input circuit generates a charge signal and a discharge signal in accordance with an input signal and the control signal. The input signal is correlated to the voltage of the switching signal. The timer circuit further generates the timing signal in accordance with the charge signal, the discharge signal and the switching signal. The timer circuit generates a charge voltage in accordance with the charge signal and the switching signal. After that, the charge voltage associates with the discharge signal to generate the timing signal once the switching signal is off. Therefore, the synchronous rectifier can be turned off before the reverse current is occurred.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a circuit diagram of a traditional power converter with synchronous rectification;

DESCRIPTION OF THE PREFERRED EMBODIMENT

Figure 1:
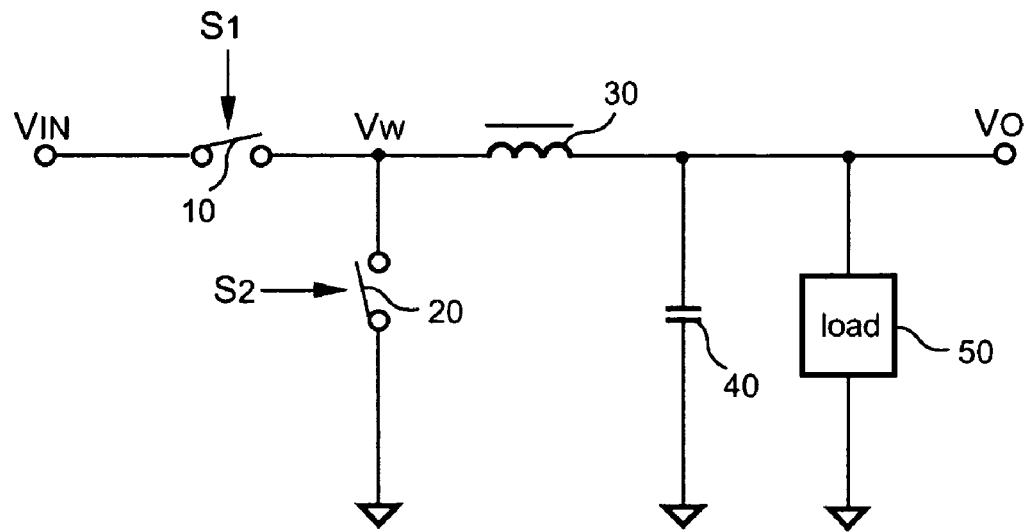
Figure 2:
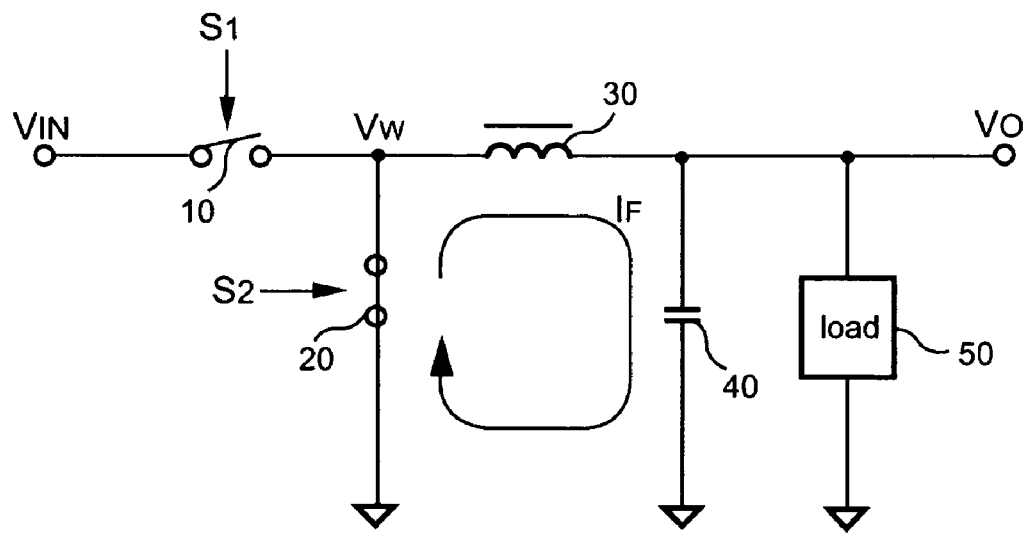
FIG. 2 shows a circuit diagram of the turn-on of the synchronous rectifier for the discharge of the inductor.
Figure 3:
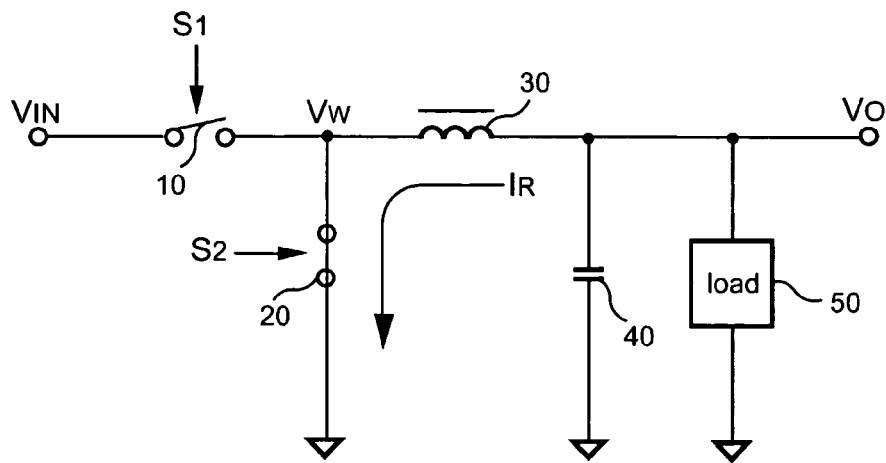
FIG. 3 shows a circuit diagram of a reverse current occurred in light load and no load conditions.
Figure 4A:
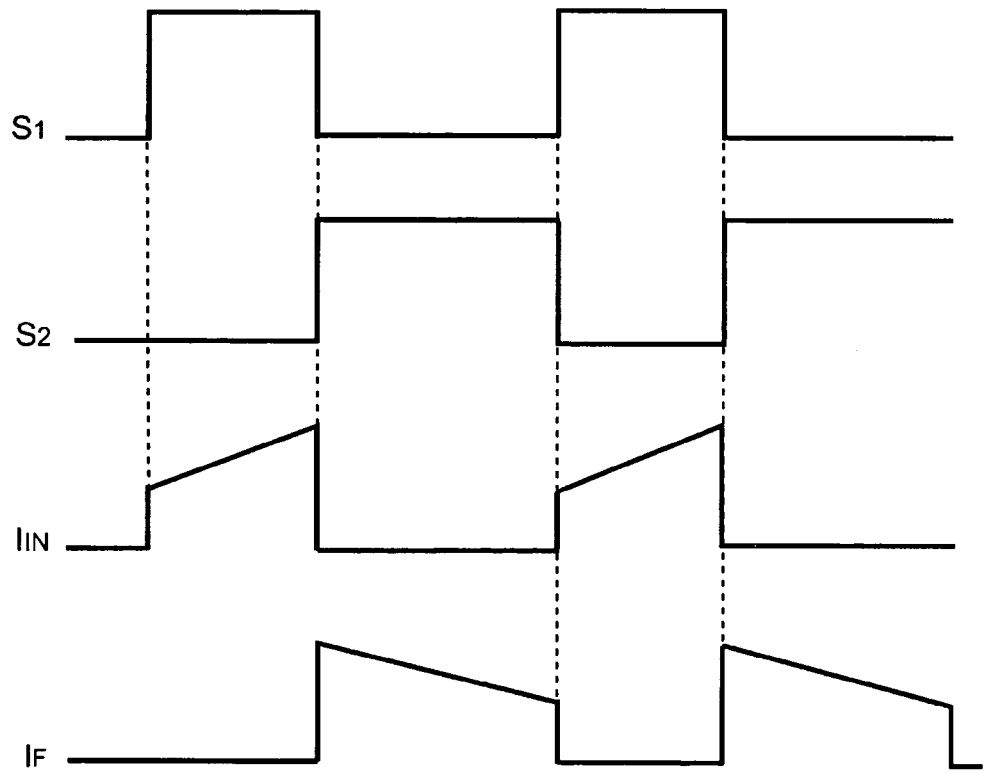
FIG. 4A shows waveforms of the traditional power converter operated in continuous current mode.
Figure 4B:
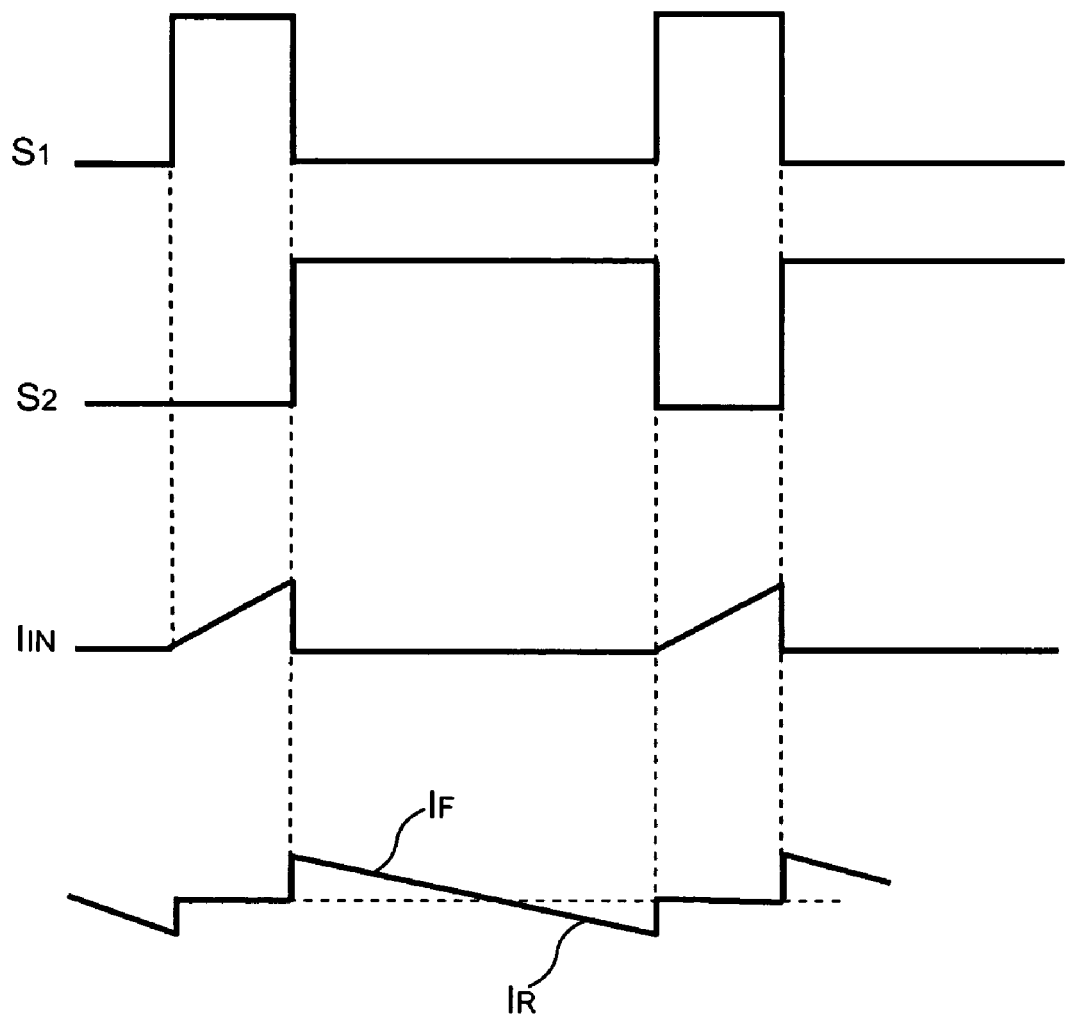
FIG. 4B shows waveforms of the traditional power converter operated in discontinuous current mode.
Figure 5:
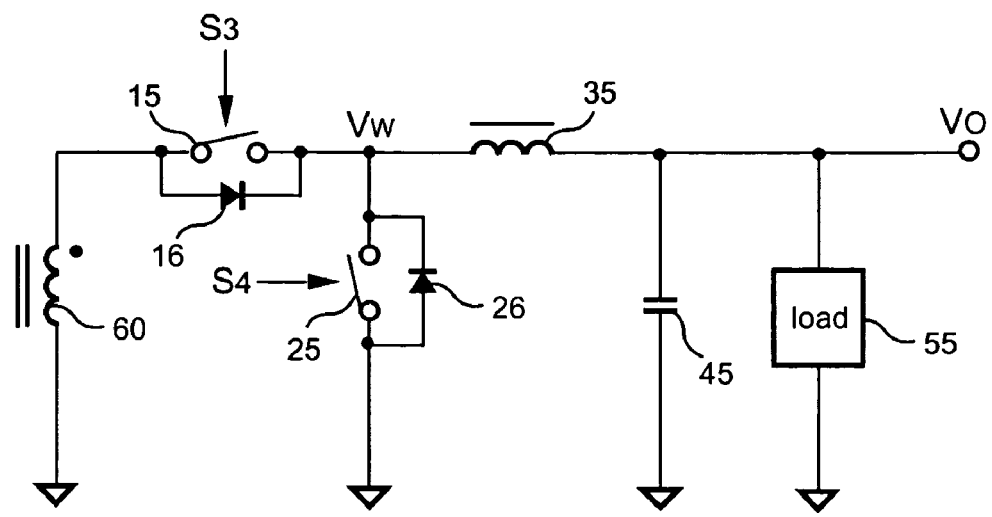
FIG. 5 shows a circuit diagram of a traditional forward power converter including synchronous rectifier.
Figure 6:
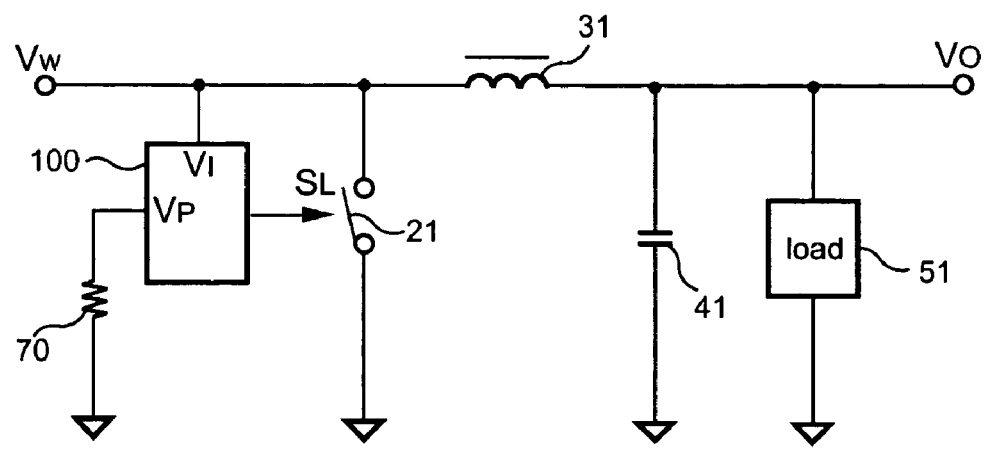
FIG. 6 shows a circuit diagram of a preferred embodiment of a power converter in accordance with present invention.

FIG. 6 shows a circuit diagram of a preferred embodiment of a power converter in accordance with present invention. The power converter is used to provide the output voltage $V_O$ to a load 51. A control circuit 100 is coupled to receive a switching signal $V_W$ and generate a drive signal $S_L$ to control a switch 21. The switch 21 is coupled from an inductor 31 to a ground to provide a low-impedance current path for the inductor 31 as long as the discharge current of the inductor 31 is existed. The switch 21 is operated as a synchronous rectifier. A capacitor 41 is coupled to the inductor 31. An input terminal $V_I$ of the control circuit 100 connects to receive the switching signal $V_W$. A program terminal $V_P$ of the control circuit 100 is coupled to a resistor 70 connected to the ground to program a control signal $V_S$ for predicting the discharge time of the inductor 31 and producing the drive signal $S_L$. The control signal $V_S$ can be programmed in accordance with the output voltage $V_O$ of the power converter.

When the switching signal $V_W$ is enabled, a charge current will flow into the inductor 31. Therefore, the on-time $T_{ON}$ of the switching signal $V_W$ represents the charge time of the inductor 31. The charge current is correlated to the voltage of the switching signal $V_W$, the output voltage $V_O$, and the inductance of the inductor 31 and the on-time $T_{ON}$ of the switching signal $V_W$. Once the switching signal $V_W$ is disabled, a discharge current will flow from the inductor 31. The output voltage $V_O$, the inductance of the inductor 31 and the magnitude of the charge current determine the discharge time $T_{OFF}$. For the continuous current mode (CCM) operation, the switching signal $V_W$ is enabled before the discharge current is discharged to zero. For the discontinuous current mode (DCM) operation, the discharge current of the inductor 31 is discharged to zero before the start of the next switching cycle. The boundary condition of CCM and DCM operation is given by $$\frac{V_{IN} - V_O}{L} \times T_{ON} = \frac{V_O}{L} \times (T - T_{ON}) \qquad (1)$$

wherein the $V_{IN}$ is the voltage of the switching signal $V_W$, L is the inductance of the inductor 31, T is the switching period of the switching signal $V_W$.

The discharge time $T_{OFF}$ of the inductor 31 can be obtained in accordance with the equation (1), in which $T_{OFF}=(T-T_{ON})$. See equations (2) and (3).

$$V_{IN} \times T_{ON} - V_O \times T_{ON} = V_O \times T_{OFF} \qquad (2)$$

$$T_{OFF} = \frac{V_{IN} - V_O}{V_O} \times T_{ON} \qquad (3)$$

It shows the discharge time $T_{OFF}$ can be predicted in accordance with the voltage $V_{IN}$ of the switching signal $V_W$, the output voltage $V_O$, and the on time $T_{ON}$ of the switching signal $V_W$.

Figure 7:
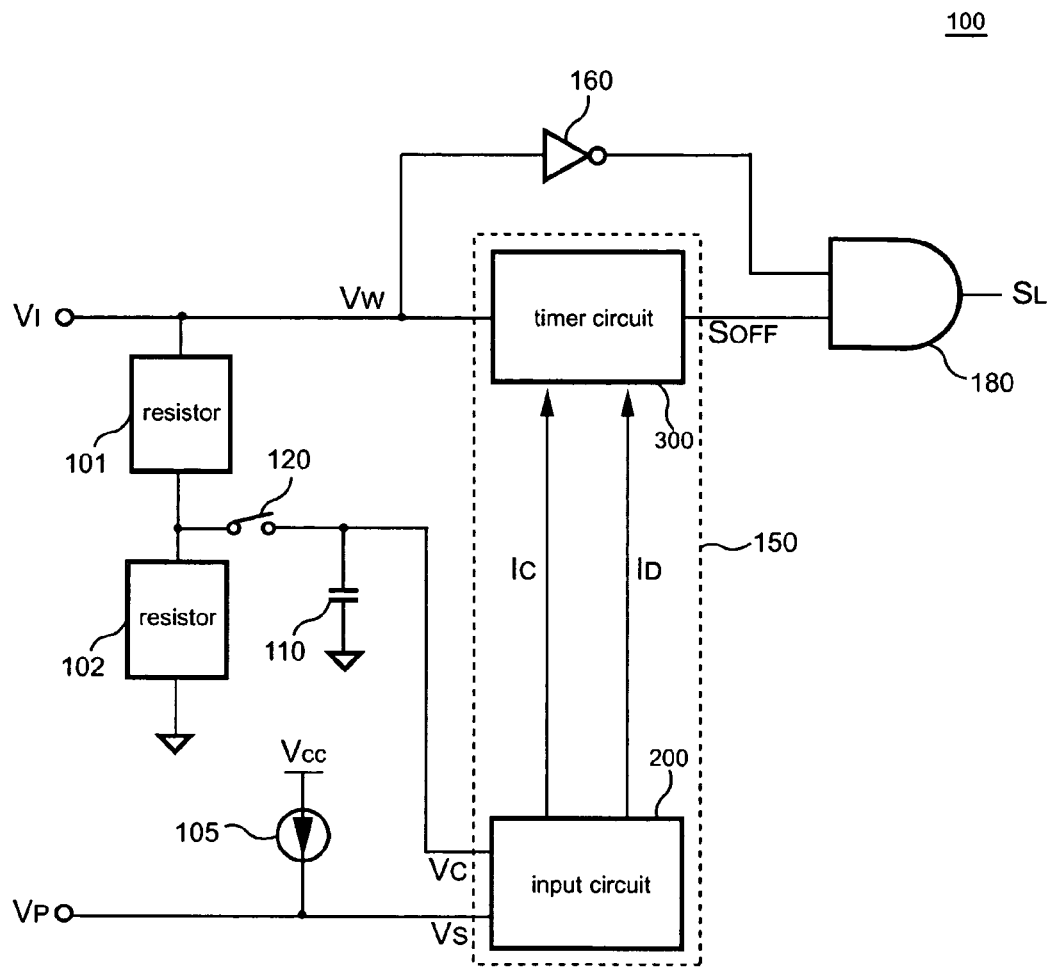
FIG. 7 shows a circuit diagram of a preferred embodiment of a control circuit in accordance with present invention.

FIG. 7 is a preferred embodiment of the control circuit 100. A voltage divider includes resistors 101 and 102, in which the resistors 101 and 102 are connected in series. The voltage divider is connected to the input terminal $V_I$ to receive the switching signal $V_W$. A switch 120 is coupled to a joint of the resistors 101 and 102 to sample the voltage $V_{IN}$ of the switching signal $V_W$ into a capacitor 110. The capacitor 110 thus generates an input signal $V_C$ transmitted to an input circuit 200. A constant current source 105 is connected to the program terminal $V_P$ of the control circuit 100. The constant current source 105 associates with the resistor 70 generate a control signal $V_S$ transmitted to the input circuit 200.

A predication circuit 150 includes the input circuit 200 and a timer circuit 300 to generate a timing signal $S_{OFF}$ in accordance with the input signal $V_C$, the control signal $V_S$ and the switching signal $V_W$. The timing signal $S_{OFF}$ represents the discharge time of the inductor 31 of the power converter. The input signal $V_C$ is correlated to the voltage $V_{IN}$ of the switching signal $V_W$. The timer circuit 300 is coupled to an input terminal of an AND gate 180 to transmit the timing signal $S_{OFF}$ to the AND gate 180. Another input terminal of the AND gate 180 is coupled to receive the switching signal $V_W$ through an inverter 160. The AND gate 180 further outputs the drive signal $S_L$ at an output terminal of the AND gate 180 to turn off the switch 21 for preventing a reverse current to the switch 21 in light load and no load conditions.

Figure 9:
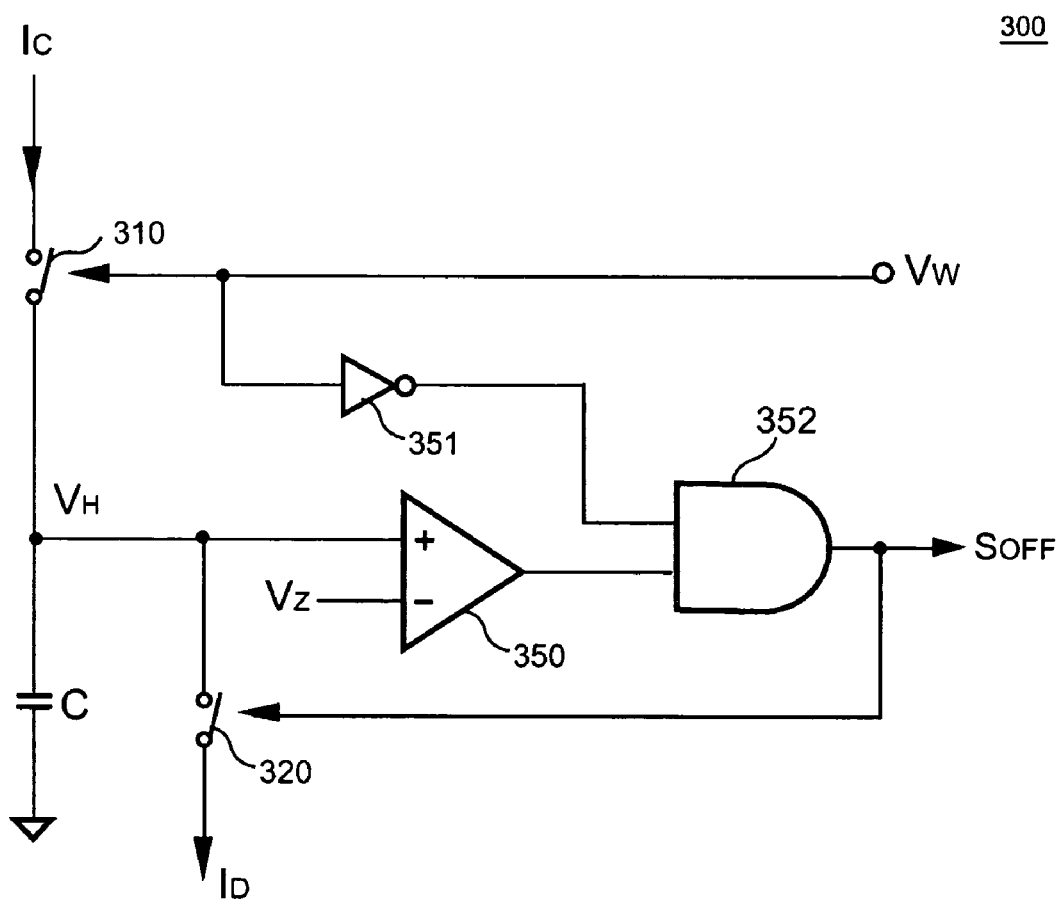
FIG. 9 shows a circuit diagram of a preferred embodiment of a timer circuit in accordance with present invention.

The input circuit 200 generates a charge signal $I_C$ and a discharge signal $I_D$ in accordance with the input signal $V_C$ and the control signal $V_S$. Subsequently, the timer circuit 300 generates the timing signal $S_{OFF}$ in accordance with the charge signal $I_C$, the discharge signal $I_D$ and the switching signal $V_W$. The timer circuit 300 generates a charge voltage $V_H$ in accordance with the charge signal $I_C$ and the switching signal $V_W$, as shown in FIG. 9. The charge voltage $V_H$ then associates with the discharge signal $I_D$ to generate the timing signal $S_{OFF}$ once the switching signal $V_W$ is off.

Figure 8:
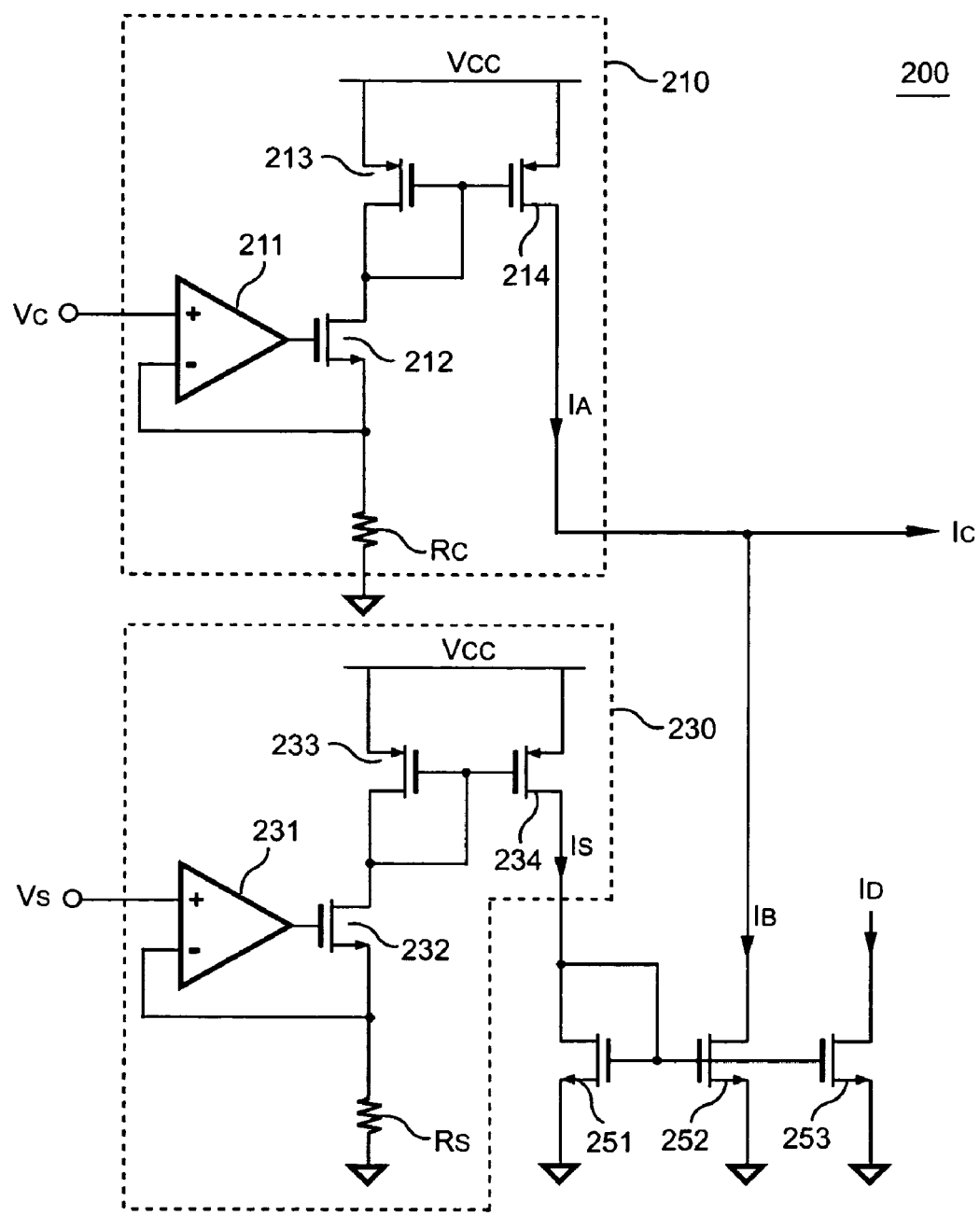
FIG. 8 shows a circuit diagram of a preferred embodiment of an input circuit in accordance with present invention.

FIG. 8 shows a circuit diagram of the input circuit 200. It comprises a first V-to-I converter 210 to generate an input current signal $I_A$ in accordance with the input signal $V_C$. The first V-to-I converter 210 includes an operational amplifier 211, a resistor $R_C$ and transistors 212, 213, 214. The positive input terminal of the operational amplifier 211 is coupled to receive the input signal $V_C$. The negative input terminal of the operational amplifier 211 is coupled to the source of the transistor 212. The output terminal of the operational amplifier 211 is coupled to the gate of the transistor 212. The resistor $R_C$ is coupled from the source of the transistor 212 to the ground. The sources of the transistors 213 and 214 are coupled to a supply voltage $V_{CC}$. The gates of the transistors 213, 214 and the drain of the transistor 213 are coupled together. The drain of the transistor 213 is further coupled to the drain of the transistor 212. The drain of the transistor 214 generates the input current signal $I_A$.

A second V-to-I converter 230 generates a control current signal $I_S$ in accordance with the control signal $V_S$. The second V-to-I converter 230 includes an operational amplifier 231, a resistor $R_S$ and transistors 232, 233, 234. The positive input terminal of the operational amplifier 231 is coupled to receive the control signal $V_S$. The negative input terminal of the operational amplifier 231 is coupled to the source of the transistor 232. The output terminal of the operational amplifier 231 is coupled to the gate of the transistor 232. The resistor $R_S$ is coupled from the source of the transistor 232 to the ground. The sources of the transistors 233 and 234 are coupled to the supply voltage $V_{CC}$. The gates of the transistors 233, 234 and the drain of the transistor 233 are coupled together. The drain of the transistor 233 is further coupled to the drain of the transistor 232. The drain of the transistor 234 generates the control current signal $I_S$.

Current mirrors include transistors 251, 252 and 253 to generate the charge signal $I_C$ and the discharge signal $I_D$ in accordance with the input current signal $I_A$ and the control current signal $I_S$. A first current mirror includes the transistors 251 and 252. The first current mirror generates a current signal $I_B$ in accordance with the control current signal $I_S$. The charge signal $I_C$ is obtained by subtracting the current signal $I_B$ from the input current signal $I_A$. The sources of the transistors 251 and 252 are coupled to the ground. The gates of the transistors 251, 252 and the drain of the transistor 251 are coupled together. The drain of the transistor 251 is further coupled to the drain of the transistor 234 to receive the control current signal $I_S$. The drain of the transistor 252 generates the current signal $I_B$. The drain of the transistor 252 is further coupled to the drain of the transistor 214 to generate the charge signal $I_C$. A second current mirror includes the transistors 251 and 253. The second current mirror generates the discharge signal $I_D$ in accordance with the control current signal $I_S$. The source of the transistor 253 is coupled to the ground. The gates of the transistors 251 and 253 are coupled together. The drain of the transistor 253 generates the discharge signal $I_D$.

It is learned from above description, the charge signal $I_C$ is determined by the input signal $V_C$, the control signal $V_S$ and the resistors $R_C$, $R_S$. It can be expressed as, $$I_C = \frac{V_C}{R_C} - \frac{V_S}{R_S} \qquad (4)$$

The discharge signal $I_D$ is determined by the control signal $V_S$ and the resistor $R_S$. It can be shown as, $$I_D = \frac{V_S}{R_S} \qquad (5)$$

FIG. 9 shows a circuit diagram of the timer circuit 300. It comprises a capacitor C for generating the charge voltage $V_H$. A charge switch 310 is coupled between the charge signal $I_C$ and the capacitor C to charge the capacitor C from the charge signal $I_C$. The on/off of the charge switch 310 is controlled by the switching signal $V_W$. Therefore, the timer circuit 300 generates the charge voltage $V_H$ in accordance with the charge signal $I_C$ and the on time of the switching signal $V_W$. A discharge switch 320 is coupled between the discharge signal $I_D$ and the capacitor C to discharge the capacitor C from the discharge signal $I_D$. The on/off of the discharge switch 320 is controlled by the timing signal $S_{OFF}$.

A comparator 350 is connected to the capacitor C to generate the timing signal $S_{OFF}$ through an AND gate 352. The timing signal $S_{OFF}$ represents the discharge time of the inductor 31 of the power converter. The positive terminal of the comparator 350 is coupled to the capacitor C to receive the charge voltage $V_H$. The negative terminal of the comparator 350 is coupled to receive a threshold $V_Z$. The output terminal of the comparator 350 is connected to an input terminal of the AND gate 352. Another input terminal of the AND gate 352 is connected to the switching signal $V_W$ via an inverter 351. The inverter 351 is coupled between the switching signal $V_W$ and the input terminal of the AND gate 352. The output terminal of the AND gate 352 generates the timing signal $S_{OFF}$. Therefore the timing signal $S_{OFF}$ is enabled in response to the disabling of the switching signal $V_W$. Furthermore, the comparator 350 compares the charge voltage $V_H$ with the threshold $V_Z$, which disables the timing signal $S_{OFF}$. The charge voltage $V_H$ can therefore be shown as, $$V_H = \frac{I_C}{C} \times T_{ON} = \frac{\frac{V_C}{R_C} - \frac{V_S}{R_S}}{C} \times T_{ON} \qquad (6)$$

Select the value of resistors $R_C$ and $R_S$ as the resistance R, and then the equation (6) can be rewritten, $$V_H = \frac{V_C - V_S}{R \times C} \times T_{ON} \qquad (7)$$

The discharge time $T_{OFF}$ of the capacitor C is given by, $$T_{OFF} = \frac{C \times V_H}{I_D} = \frac{C \times V_H}{\frac{V_S}{R}} \qquad (8)$$

According to equations (7) and (8) the discharge time $T_{OFF}$ of the capacitor C can be designed as the discharge time $T_{OFF}$ of the inductor 31.

$$T_{OFF} = \frac{V_C - V_S}{V_S} \times T_{ON} \qquad (9)$$

Assign $V_C$ equals to $\alpha \times V_{IN}$, $V_S$ equals to $\beta \times V_O$, and $\alpha$ equals to $\beta$.

$$T_{OFF} = \frac{\alpha \times V_{IN} - \beta \times V_O}{\beta \times V_O} \times T_{ON} = \frac{V_{IN} - V_O}{V_O} \times T_{ON} \qquad (10)$$

wherein $\alpha$ is a constant determined by the ratio of the resistors 101, 102; $\beta$ is a constant determined by the current mirror ratio of the transistors 251, 252.

Because the timing signal $S_{OFF}$ represents the discharge time of the inductor 31 of the power converter. Therefore, the on time of the timing signal $S_{OFF}$ is increased in response to the increase of the voltage $V_{IN}$ of the switching signal $V_W$. Furthermore, the on time of the timing signal $S_{OFF}$ is decreased in response to the decrease of on time $T_{ON}$ of the switching signal $V_W$. The control signal $V_S$ is a programmable signal, it can be set in accordance with the output voltage $V_O$ for the predication of the discharge time $T_{OFF}$ of the inductor 31. Therefore the switch 21 can be turned off in advance to prevent the generation of the reverse current.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A control circuit to reduce a reverse current of a synchronous rectifier, comprising:
   a predication circuit predicting a discharge time for discharging an inductor of a power converter and generating a timing signal to turn off the synchronous rectifier of the power converter in response to a switching signal and a control signal, in which the timing signal represents the discharge time of the inductor of the power converter;

wherein the control signal is related to an output voltage of the power converter, an on time of the switching signal is correlated to a charge time of the inductor.

2. The circuit as claimed in claim 1 wherein an on time of the timing signal is decreased in response to a decrease of the on time of the switching signal, and the on time of the timing signal is increased in response to an increase of a voltage of the switching signal.

3. The circuit as claimed in claim 1, wherein the control signal is a programmable signal.

4. A control circuit to reduce a reverse current of a synchronous rectifier, comprising:

a predication circuit generating a timing signal to turn off the synchronous rectifier of a power converter in response to a switching signal and a control signal, in which the timing signal represents a discharge time of an inductor of the power converter, the control signal being related to an output voltage of the power converter, an on time of the switching signal being correlated to a charge time of the inductor, the prediction circuit including:

an input circuit generating a charge signal and a discharge signal in accordance with an input signal and the control signal, in which the input signal is correlated to a voltage of the switching signal; and a timer circuit coupled to the input circuit for generating the timing signal in accordance with the charge signal, the discharge signal and the on time of the switching signal;

wherein the timer circuit generates a charge voltage in accordance with the charge signal and the on time of the switching signal and then generates the timing signal in accordance with the charge voltage and the discharge signal once the switching signal is turned off.

5. The circuit as claimed in claim 4, wherein the input circuit, comprising:

a first V-to-I converter generating an input current signal in accordance with the input signal;

a second V-to-I converter generating a control current signal in accordance with the control signal; and current mirrors coupled to the first V-to-I converter and the second V-to-I converter to generate the charge signal and the discharge signal in accordance with the input current signal and the control current signal.

6. The circuit as claimed in claim 4, wherein the timer circuit, comprising:

a capacitor generating the charge voltage;

a charge switch coupled between the charge signal and the capacitor to charge the capacitor from the charge signal, in which the on/off of the charge switch is controlled by the switching signal;

a discharge switch coupled between the discharge signal and the capacitor to discharge the capacitor from the discharge signal, in which the on/off of the discharge switch is controlled by the timing signal; and a comparator coupled to the capacitor to generate the timing signal, in which the comparator compares the charge voltage with a threshold to disable the timing signal.

7. A control circuit to reduce a reverse current of a synchronous rectifier, comprising:

a predication circuit predicting a discharge time for discharging an inductor of a power converter and generating a timing signal to turn off the synchronous rectifier of the power converter in response to a switching signal;

wherein an on-time of the switching signal is correlated to a charge time of the inductor of the power converter.

8. The circuit as claimed in claim 7 wherein an on time of the timing signal is decreased in response to a decrease of the on time of the switching signal, and the on time of the timing signal is increased in response to an increase of a voltage of the switching signal.

9. A control circuit to reduce a reverse current of a synchronous rectifier, comprising:

a predication circuit generating a timing signal to turn off the synchronous rectifier of a power converter in response to a switching signal; wherein an on time of the switching signal is correlated to a charge time of an inductor of the power converter, the prediction circuit including:

an input circuit generating a charge signal and a discharge signal in accordance with an input signal and a control signal, in which the input signal is correlated to a voltage of the switching signal, the control signal is related to an output voltage of the power converter; and a timer circuit coupled to the input circuit to generate the timing signal in accordance with the charge signal, the discharge signal and the switching signal;

wherein the timer circuit generates a charge voltage in accordance with the charge signal and the on time of the switching signal and then generates the timing signal in accordance with the charge voltage and the discharge signal once the switching signal is turned off.

10. The circuit as claimed in claim 9, wherein the control signal is a programmable signal.

11. The circuit as claimed in claim 9, wherein the input circuit, comprising:

a first V-to-I converter generating an input current signal in accordance with the input signal;

a second V-to-I converter generating a control current signal in accordance with the control signal; and current mirrors coupled to the first V-to-I converter and the second V-to-I converter to generate the charge signal and the discharge signal in accordance with the input current signal and the control current signal.

12. The circuit as claimed in claim 9, wherein the timer circuit, comprising:

a capacitor generating the charge voltage;

a charge switch coupled between the charge signal and the capacitor to charge the capacitor from the charge signal, in which the on/off of the charge switch is controlled by the switching signal;

a discharge switch coupled between the discharge signal and the capacitor to discharge the capacitor from the discharge signal, the on/off of the discharge switch is controlled by the timing signal; and a comparator coupled to the capacitor to generate the timing signal, in which the comparator compares the charge voltage with a threshold to disable the timing signal.

* * * * *